US012752357B2

(12) United States Patent
Ichikawa et al.

(10) Patent No.: US 12,752,357 B2
(45) Date of Patent: Oct. 6, 2026

(54) MANUFACTURING METHOD FOR HEAT EXCHANGER

(71) Applicant: DAIKIN INDUSTRIES, LTD., Osaka (JP)

(72) Inventors: Nobuyasu Ichikawa, Osaka (JP); Hironori Kubo, Osaka (JP); Tatsuya Omaki, Osaki (JP); Ryou Kouyama, Osaka (JP); Fumio Yabuuchi, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 19/057,692

(22) Filed: Feb. 19, 2025

(65) Prior Publication Data

US 2025/0187092 A1 Jun. 12, 2025

Related U.S. Application Data

(63) Continuation of application No. PCT/JP2023/014994, filed on Apr. 13, 2023.

(30) Foreign Application Priority Data

Aug. 26, 2022 (JP) ................................ 2022-135331

(51) Int. Cl.

*B23K 1/00* (2006.01)
*B23K 101/14* (2006.01)
*B23K 103/10* (2006.01)

(52) U.S. Cl.

CPC ........ *B23K 1/0012* (2013.01); *B23K 2101/14* (2018.08); *B23K 2103/10* (2018.08)

(58) Field of Classification Search

CPC .............. B23K 1/0012; B23K 2101/14; B23K 2103/10; B23K 1/012; B23K 3/043; F28F 2275/045; F28F 1/325; F28D 1/0477

(Continued)

(56) References Cited

U.S. PATENT DOCUMENTS 4,480,165 A * 10/1984 Haushalter ........... B23K 1/0012 228/183
4,504,223 A * 3/1985 Yamada ............... B23K 1/0012 228/183

(Continued)

FOREIGN PATENT DOCUMENTS

CN 203704713 U 7/2014
CZ 302437 B6 * 5/2011 ............... B23K 3/08

(Continued)

OTHER PUBLICATIONS

International Preliminary Report of corresponding PCT Application No. PCT/JP2023/014994 dated Mar. 13, 2025.

(Continued)

*Primary Examiner* — Kiley S Stoner

(74) *Attorney, Agent, or Firm* — Spencer Fane LLP

(57) ABSTRACT

A heat exchanger includes a plurality of fins arranged in a thickness direction and a plurality of heat transfer tubes penetrating the plurality of fins, the heat transfer tubes being made of aluminum. A method for manufacturing the heat exchanger includes connecting a first open end portion of open end portions of the heat transfer tubes protruding from the fins and a first connection pipe made of aluminum, and first brazing a first joint between the first open end portion and the first connection pipe by heating the first joint with a first burner that is movable around the first joint.

12 Claims, 10 Drawing Sheets

(58) Field of Classification Search
USPC .......................... 228/183, 218–220, 245–255
See application file for complete search history.

(56) References Cited

U.S. PATENT DOCUMENTS

| | | | | | |
|---|---|---|---|---|---|
| 5,358,169 | A * | 10/1994 | Caddock | B23K 1/0016 228/180.1 |
| 8,074,356 | B2 * | 12/2011 | Branyon | B23K 1/0012 29/523 |
| 8,960,522 | B2 * | 2/2015 | Taras | B23K 1/0012 228/183 |
| 2004/0253474 | A1 * | 12/2004 | Akamatsu | H05K 3/3415 228/248.1 |
| 2014/0084043 | A1 | 3/2014 | Taras et al. | |
| 2016/0003548 | A1 * | 1/2016 | Saito | F28F 21/089 165/173 |
| 2017/0114932 | A1 * | 4/2017 | Nakajima | F28F 9/182 |
| 2017/0184351 | A1 * | 6/2017 | Satake | F25B 41/42 |
| 2018/0214963 | A1 * | 8/2018 | Hosono | B23K 1/002 |
| 2022/0306954 | A1 * | 9/2022 | Orivam De Morais | C10L 3/02 |
| 2024/0118045 | A1 * | 4/2024 | Cho | F28F 1/32 |
| 2025/0187092 | A1 * | 6/2025 | Ichikawa | F28F 1/325 |

FOREIGN PATENT DOCUMENTS

| | | | | |
|---|---|---|---|---|
| EP | 2645042 | A1 * | 10/2013 | F28F 1/32 |
| EP | 2655001 | B1 * | 4/2017 | B23K 1/00 |
| JP | 02251363 | A * | 10/1990 | |
| JP | 6-297141 | A | 10/1994 | |
| JP | 2000-15433 | A | 1/2000 | |
| JP | 9-267168 | A | 2/2002 | |
| JP | 2002-35928 | A | 2/2002 | |
| JP | 2003-39164 | A | 2/2003 | |
| JP | 2003039164 | A * | 2/2003 | |
| JP | 2009-148807 | A | 7/2009 | |
| JP | 2010-172943 | A | 8/2010 | |
| JP | 2010-247180 | A | 11/2010 | |
| JP | 2017-198403 | A | 11/2017 | |
| JP | 6762719 | B2 * | 9/2020 | |
| JP | 2022029195 | A * | 2/2022 | |
| WO | WO-2014156845 | A1 * | 10/2014 | B23K 1/20 |
| WO | WO-2014156846 | A1 * | 10/2014 | B23K 3/08 |
| WO | 2021/100173 | A1 | 5/2021 | |
| WO | WO-2024075931 | A1 * | 4/2024 | B23K 1/0012 |
| WO | WO-2024185602 | A1 * | 9/2024 | B23P 15/26 |

OTHER PUBLICATIONS

International Search Report of corresponding PCT Application No. PCT/JP2023/014994 dated Jun. 20, 2023.

Opposition filed by the Opponent in Japanese Patent Application No. 2022-135331 dated Sep. 17, 2024.

Decision on Opposition in Japanese Patent Application No. 2022-135331 dated Nov. 21, 2024.

European Search Report of corresponding EP Application No. 23 85 6892.7 dated Oct. 8, 2025.

* cited by examiner

START

↓

CLAMPING

↓

CONNECTING

↓

FIRST BRAZING

↓

SECOND BRAZING

↓

RETURN

MANUFACTURING METHOD FOR HEAT EXCHANGER

CROSS-REFERENCE TO RELATED APPLICATIONS

This is a continuation of International Application No. PCT/JP2023/014994 filed on Apr. 13, 2023, which claims priority to Japanese Patent Application No. 2022-135331, filed on Aug. 26, 2022. The entire disclosures of these applications are incorporated by reference herein.

BACKGROUND

Technical Field

The present disclosure relates to a manufacturing method for a heat exchanger.

Background Art

In a typical fin-and-tube heat exchanger, open ends of heat transfer tubes protruding from laminated fins and U-shaped vent pipes are connected to each other by brazing. Japanese Unexamined Patent Publication No. 2010-172943 discloses that a multi-head burner is used to simultaneously braze the open ends of the heat transfer tubes and the U-shaped vent pipes.

SUMMARY

A first aspect of the present disclosure is directed to a method for manufacturing a heat exchanger including a plurality of fins arranged in a thickness direction and a plurality of heat transfer tubes penetrating the fins, the heat transfer tubes being made of aluminum. The method includes connecting a first open end portion of open end portions of the heat transfer tubes protruding from the fins and a first connection pipe made of aluminum, and first brazing a first joint between the first open end portion and the first connection pipe by heating the first joint with a first burner that is movable around the first joint.

BRIEF DESCRIPTION OF THE DRAWINGS

FIG. 5A shows a joint before brazing, and FIG. 5B shows the joint after brazing.

DETAILED DESCRIPTION OF EMBODIMENT(S)

An embodiment of the present disclosure will be described with reference to the drawings. The following embodiments are merely exemplary ones in nature, and are not intended to limit the scope, application, or uses of the invention. Features of the embodiments, variations, and other examples described below can be combined or partially substituted within the range where the present invention can be embodied. The terms "front," "back," "upper," "lower," "right," and "left" used in the following description refer to directions with reference to a heat exchanger (1) shown in FIG. 1 viewed from the front.

(1) Heat Exchanger

Figure 1:
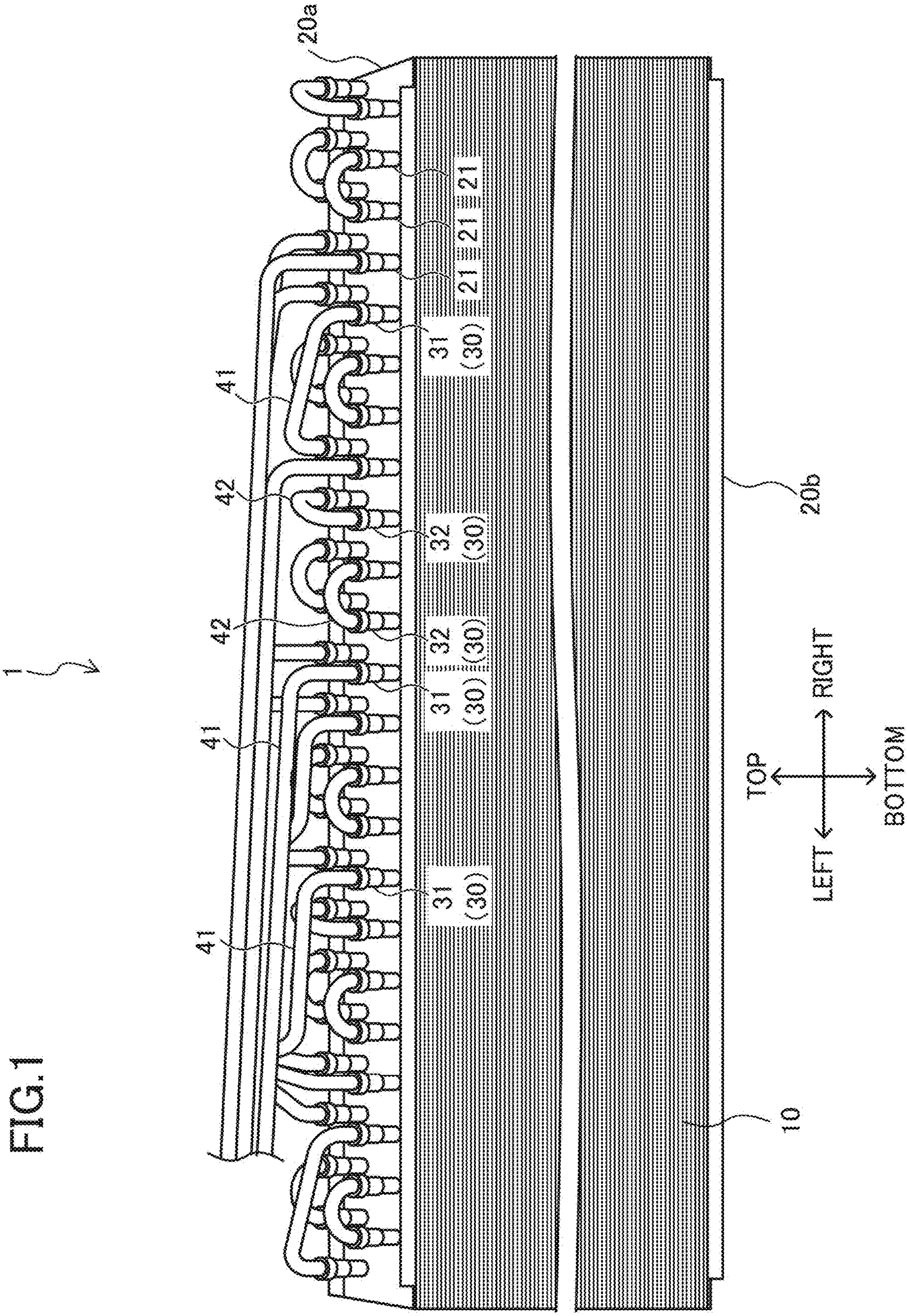
FIG. 1 is a three-dimensional perspective view of a heat exchanger according to an embodiment.
Figures 2, 3:
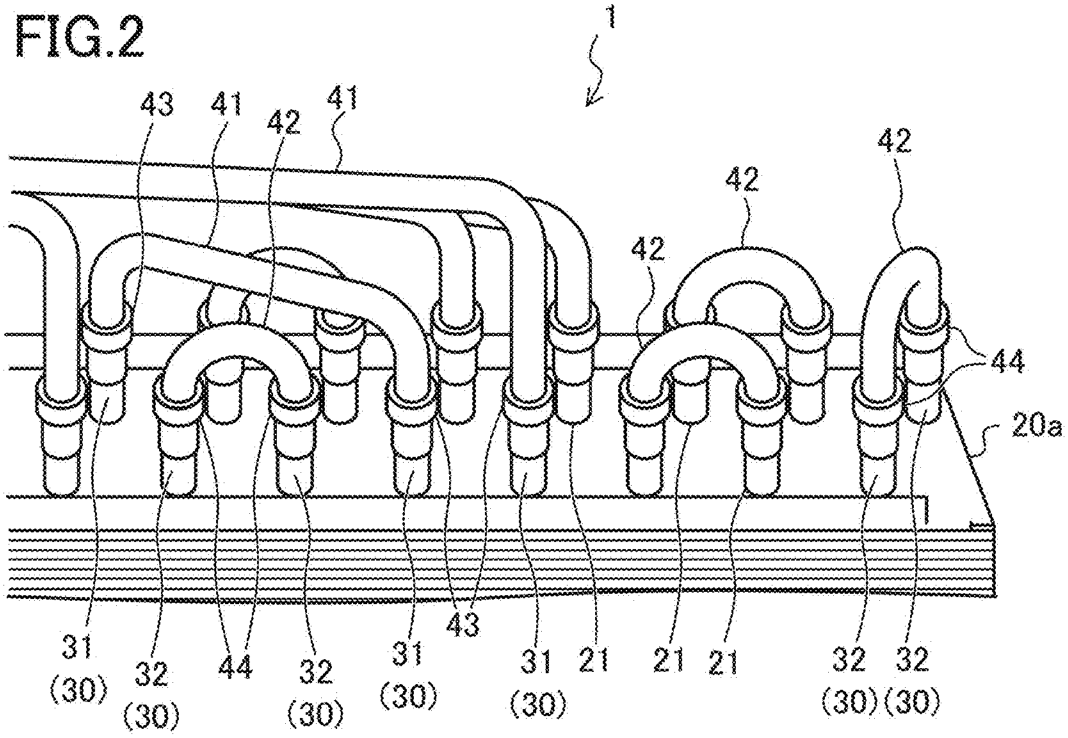
FIG. 2 is a three-dimensional perspective view showing part of the heat exchanger in an enlarged scale.
FIG. 3 is a flowchart of a method for manufacturing the heat exchanger.

As illustrated in FIGS. 1 and 2, a heat exchanger (1) of this embodiment is a fin-and-tube heat exchanger. The heat exchanger (1) includes fins (10), tube plates (20*a*, 20*b*), heat transfer tubes (30), second connection pipes (42), and first connection pipes (41). In the following description, a temporary assembly of the fins (10) and the heat transfer tubes (30) to which the first connection pipes (41) and the second connection pipes (42) are not connected yet may also be referred to as a heat exchanger.

(1-1) Fins

The fins (10) are made of aluminum. Each fin (10) is formed in a substantially rectangular long plate shape. The fins (10) are arranged in the thickness direction to form the heat exchanger (1) having a substantially rectangular parallelepiped shape. Each fin (10) has a plurality of holes (not shown) through which the heat transfer tubes (30) pass.

(1-2) Tube Plates

The tube plates (20*a*, 20*b*) include a first tube plate (20*a*) and a second tube plate (20*b*). Each of the tube plates (20*a*, 20*b*) is formed in a plate shape having substantially the same size as the fins (10). The first tube plate (20*a*) is arranged on an upper end of the heat exchanger (1). The second tube plate (20*b*) is arranged on a lower end of the heat exchanger (1). The first tube plate (20*a*) and the second tube plate (20*b*) sandwich the fins (10) in the vertical direction. Each of the tube plates (20*a*, 20*b*) has a plurality of through holes (21) through which the heat transfer tubes (30) pass. The through holes (21) are arranged in a row in the right-to-left direction in each of front and rear portions of each of the tube plates (20*a*, 20*b*).

(1-3) Heat Transfer Tubes

The heat transfer tubes (30) are made of aluminum. The heat transfer tubes (30) penetrate the two tube plates (20*a*, 20*b*) and the fins (10) in the thickness direction. Each of the heat transfer tubes (30) is formed in a hairpin shape and has open end portions (31, 32) both protruding upward from the through holes (21) of the first tube plate (20*a*). In the following description, each open end portion (31, 32) refers to a portion of the heat transfer tube (30) protruding upward from the first tube plate (20*a*).

When the heat exchanger (1) is viewed from above, the open end portions (31, 32) of the heat transfer tubes (30) are arranged in a row in the right-to-left direction in each of the front and rear portions of the heat exchanger (1). The open end portions (31, 32) of the heat transfer tubes (30) protruding from the first tube plate (20*a*) include first open end portions (31) and second open end portions (32). The first open end portions (31) and the second open end portions (32) protrude from the fins (10). The first connection pipes (41) described later are connected to the first open end portions (31). The second connection pipes (42) described later are connected to the second open end portions (32).

(1-4) Second Connection Pipes

The second connection pipes (42) are pipes connected to the second open end portions (32). In other words, among the open end portions (31, 32) protruding upward from the first tube plate (20*a*), the second open end portions (32) are those connected to the second connection pipes (42).

Two second open end portions (32) connected to the same second connection pipe (42) are adjacent to each other. Thus, the second connection pipe (42) connects the second open end portions (32) adjacent to each other in the right-to-left direction or the front-to-back direction. The second connection pipe (42) is made of aluminum. The second connection pipe (42) is formed in a U-shape. As will be described in detail later, the second connection pipe (42) has a lower heat capacity than the first connection pipe (41).

(1-5) First Connection Pipes

The first connection pipes (41) are pipes connected to the first open end portions (31). In this embodiment, among the open end portions (31, 32) protruding upward from the first tube plate (20*a*), the first open end portions (31) are the open end portions (31) other than the second open end portions (32). Each first connection pipe (41) connects the open end portions (31) that are not adjacent to each other or connects a flow divider (not shown) and the open end portion (31).

The first connection pipes (41) are made of aluminum. The first connection pipes (41) and the second connection pipes (42) have the same inner diameter and the same outer diameter. The first connection pipes (41) are longer than the second connection pipes (42). Thus, the first connection pipes (41) have a higher heat capacity than the second connection pipes (42).

(2) Method for Manufacturing Heat Exchanger

A method for manufacturing the heat exchanger (1) of this embodiment will be described below. The manufacturing method of this embodiment is applicable to various types of heat exchangers (1). The various types of heat exchangers (1) are different from each other in, for example, the thickness of the fins (10) stacked, the number of the heat transfer tubes (30), and the number and arrangement of the first connection pipes (41) or the second connection pipes (42).

As illustrated in FIG. 3, the manufacturing method of this embodiment includes clamping, connecting, first brazing, and second brazing. The heat exchanger (1), which is a temporary assembly of the fins (10) and the heat transfer tubes (30), goes through the clamping, the connecting, the first brazing, and the second brazing in this order. In this embodiment, the method for manufacturing the heat exchanger (1) uses an apparatus for manufacturing the heat exchanger (1). The manufacturing apparatus for the heat exchanger includes a clamp mechanism (50), a first brazing device (60), and a second brazing device (70). Details of these devices will be described in the following steps.

(2-1) Clamping

Figure 4A:
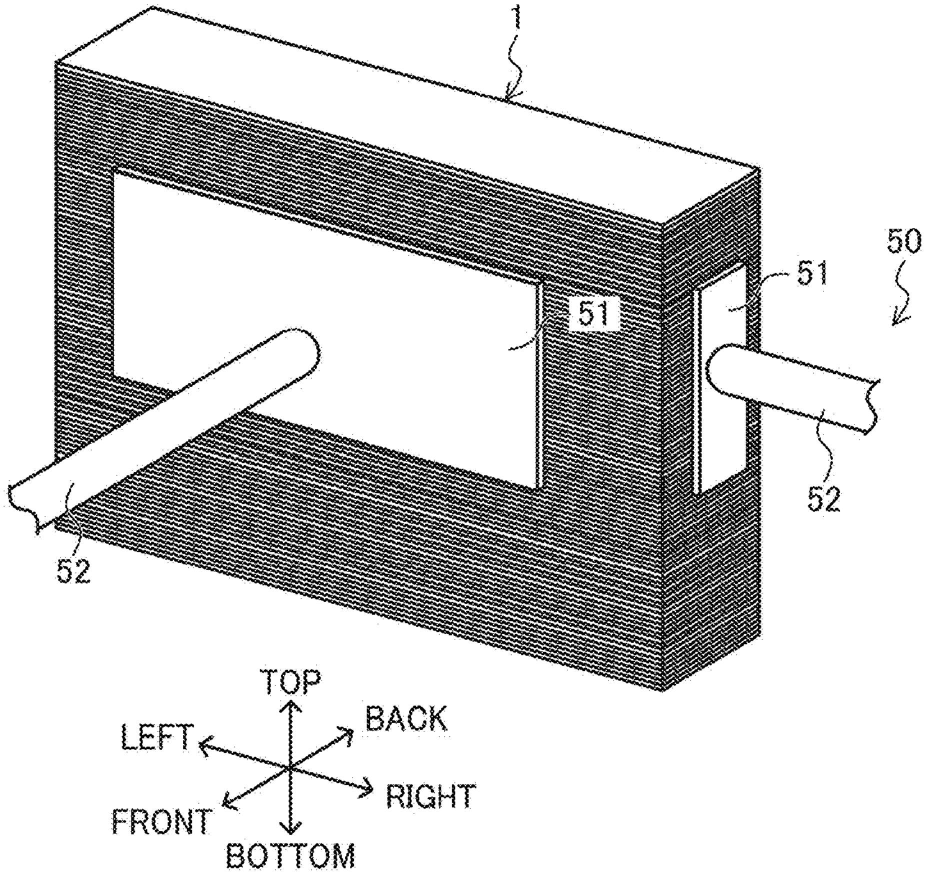
FIG. 4A is a three-dimensional perspective view and FIG. 4B is a top view, each schematically showing the heat exchanger clamped by a clamp mechanism.

As illustrated in FIG. 4A, the clamping includes fixing the heat exchanger (1) with the clamp mechanism (50). The clamp mechanism (50) positions and fixes the heat exchanger (1) so that the heat exchanger (1) is not displaced in the horizontal direction. Fixing the heat exchanger (1) in this way reduces variations in brazing accuracy among the heat exchangers (1) in the first brazing (details will be described later).

Figure 4B:
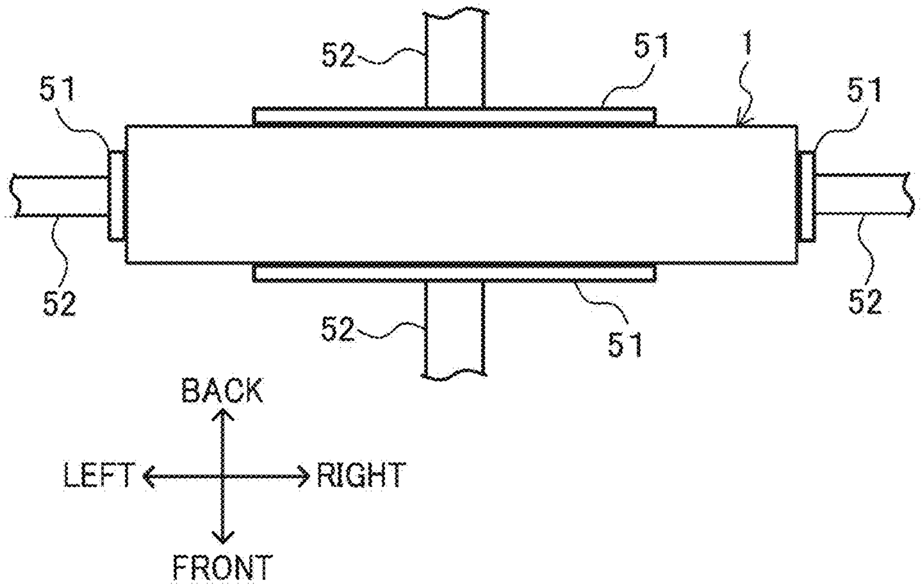

As illustrated in FIG. 4B, in the clamping of this embodiment, side surfaces of the heat exchanger (1) are fixed. Specifically, the clamp mechanism (50) includes four plate members (51, 51, 51, 51) and extendable arms (52, 52, 52, 52) supporting the plate members (51). The clamp mechanism (50) includes a clamp controller (not shown) that controls the movement of each arm (52). The clamp mechanism (50) holds the heat exchanger (1) by sandwiching the heat exchanger (1) in the right-to-left direction with two of the plate members (51, 51) and in the front-to-back direction with the other two of the plate members (51, 51). The heat exchanger (1) fixed by the clamp mechanism (50) is transferred to the subsequent step.

The clamp mechanism (50) holds part of the heat exchanger (1) above the center in the height direction. This keeps an upper end of the heat exchanger (1) from swinging in the front-to-back direction, stabilizing the degree of brazing of the first joint (43) by the first brazing (details will be described later).

The clamp mechanism (50) of this embodiment can adjust part of the heat exchanger (1) that the clamp mechanism (50) holds in the height direction. For example, when the heat exchanger (1) is relatively tall (the fins (10) are stacked thick), the plate members (51, 51, 51, 51) are positioned at a relatively high position. On the other hand, when the heat exchanger (1) is relatively short, the plate members (51, 51, 51, 51) are positioned at a relatively low position. Thus, the clamp mechanism (50) is applicable to the manufacture of various types of heat exchangers (1).

(2-2) Connecting

Figure 5A:
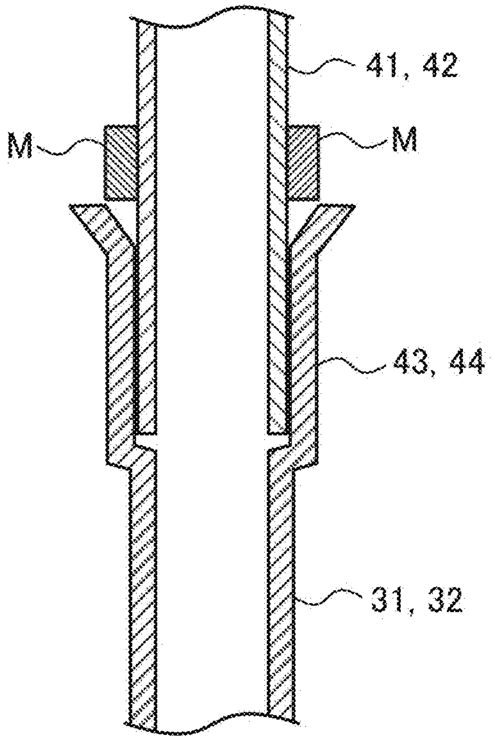
FIGS. 5A and 5B are longitudinal sectional views showing a connection pipe and a heat transfer tube connected together, where

As illustrated in FIG. 5A, the connecting is a step of connecting the first open end portion (31) of the heat transfer tube (30) and the first connection pipe (41) and connecting the second open end portion (32) and the second connection pipe (42). In the following description, a connection between the first open end portion (31) and the first connection pipe (41) will be referred to as a first joint (43). A connection between the second open end portion (32) and the second connection pipe (42) will be referred to as a second joint (44). A ring-shaped brazing material (M) is arranged in advance on an outer peripheral surface of each of the first connection pipe (41) and the second connection pipe (42) near its end.

The open end portion (31, 32) of each heat transfer tube (30) is widened in advance by flare processing. In the connecting, the first connection pipe (41) is inserted into the first open end portion (31). Likewise, the second connection pipe (42) is inserted into the second open end portion (32). Specifically, each open end portion (31, 32) has a secondary flare having an increased diameter and a tertiary flare that is more flared from an upper end of the secondary flare. Each connection pipe (41, 42) is inserted into the secondary flare, and the brazing material (M) is placed to rest on the tertiary flare (open end portion (31, 32)).

Figure 5B:
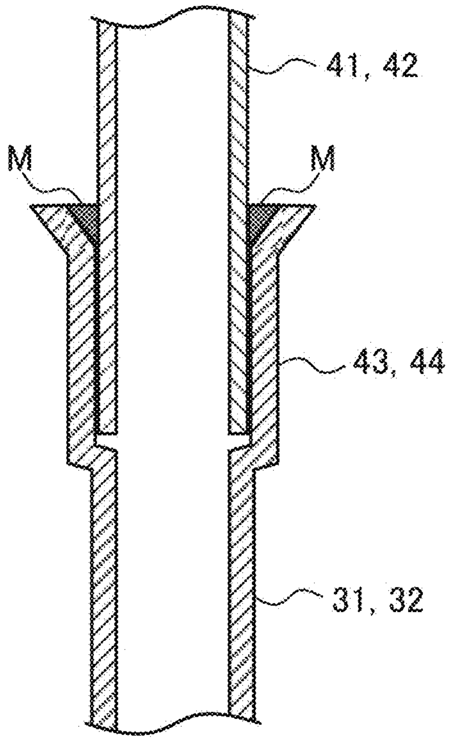

FIG. 5B shows the joint (43, 44) brazed by the first brazing and the second brazing. The brazing material (M)

molten by heating flows into a gap in the first joint (43) and a gap in the second joint (44) and solidifies. Specifically, the brazing material (M) flows to the secondary flare in each of the first joint (43) and the second joint (44). Thus, the solidified brazing material forms fillets at the first joint (43) and the second joint (44).

(2-3) First Brazing

Figure 6:
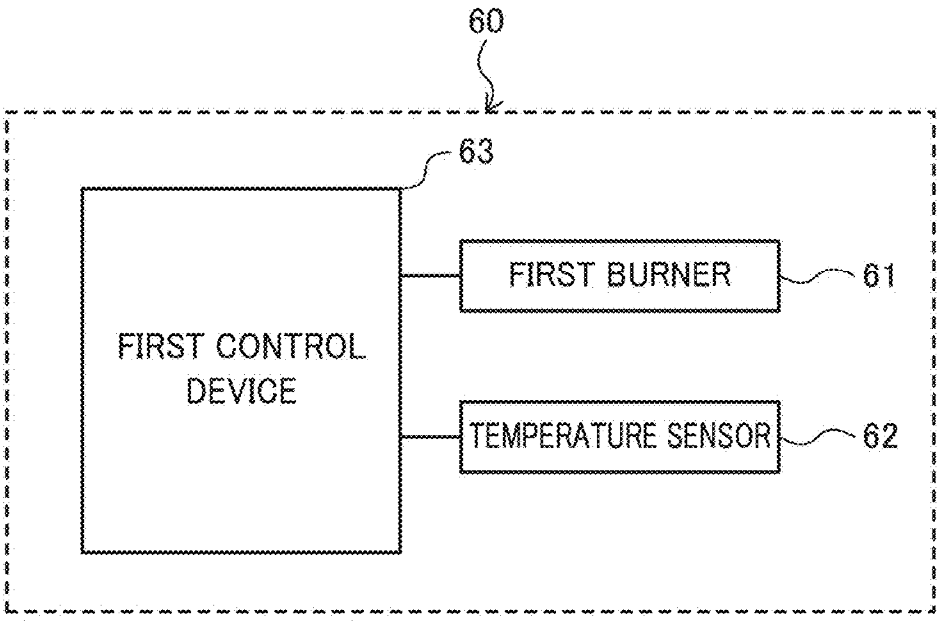
FIG. 6 is a block diagram showing the configuration of a first brazing device.
Figure 7:
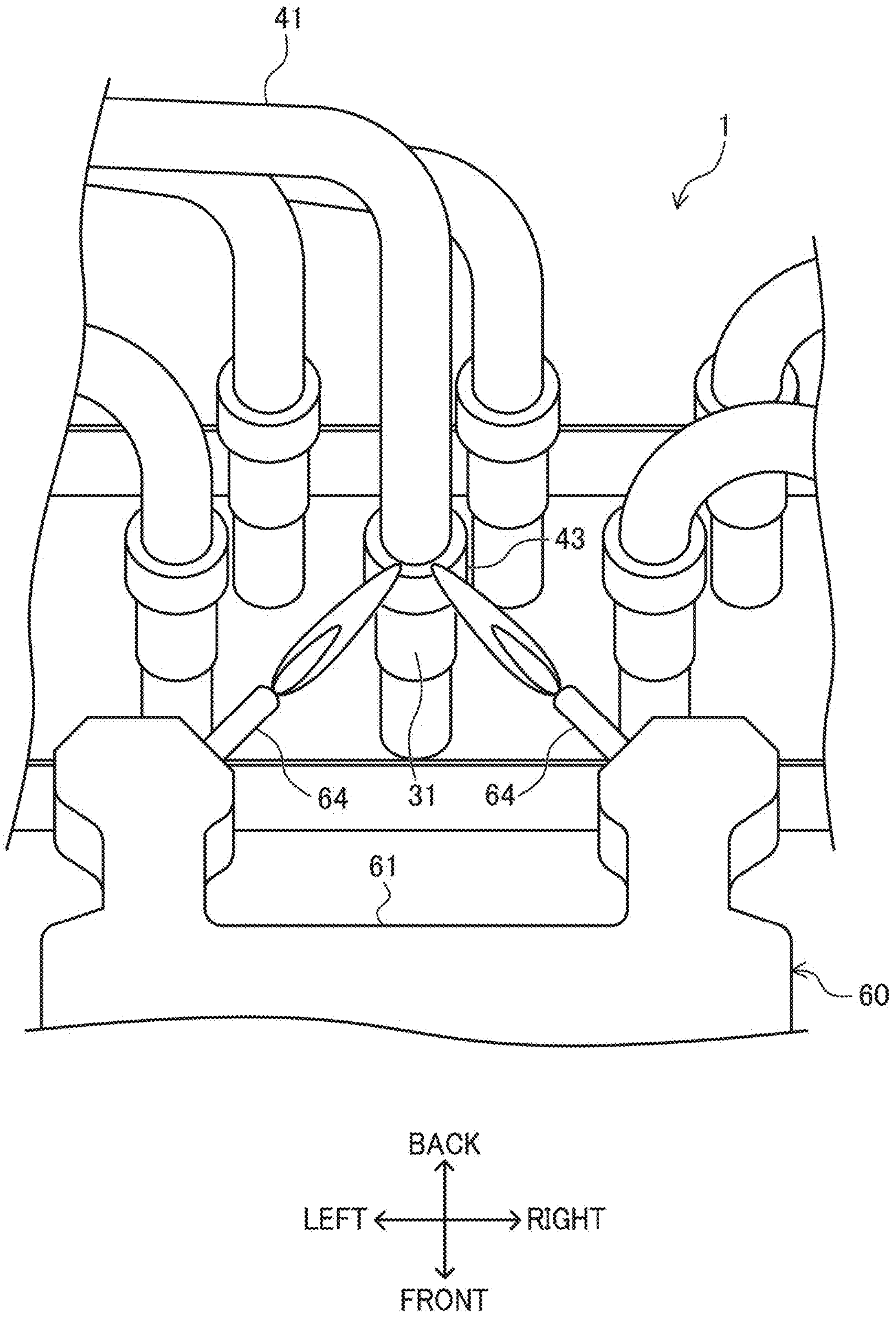
FIG. 7 is a three-dimensional perspective view showing a first burner brazing a first joint.

As illustrated in FIGS. 6 and 7, the first brazing is a step of brazing the joint between the first open end portion (31) and the first connection pipe (41). The first brazing device (60) is used in the first brazing. The first brazing device (60) includes a first burner (61), a temperature sensor (62), and a first control device (63).

The first burner (61) heats the first joint (43) which is a connection between the first open end portion (31) and the first connection pipe (41). The first burner (61) is movable. The first burner (61) is movable around the first joint (43). The first burner (61) has two movable torches (64, 64).

Each of the movable torches (64) emits heating flame toward one of the first joints (43). Specifically, the two movable torches (64) are arranged in a fork shape and blow the heating flame from outlets at distal ends of the movable torches (64). The two movable torches (64) are formed to approach each other as they extend from the proximal end to the outlet at the distal end. In this way, the first burner (61) heats the first joint (43) from two directions.

A predetermined gas is used to produce the heating flame emitted from the first burner (61). The combustion of the predetermined gas allows the movable torches (64) to emit the heating flame. The size of the heating flame emitted from the movable torches (64) is adjusted by the flow rate of the predetermined gas. The predetermined gas is a mixed gas of a combustion gas and air. The combustion gas is, for example, a city gas. The air has an oxygen concentration of 95% or more.

The temperature sensor (62) detects the temperature of the first burner (61). Specifically, the temperature sensor (62) detects the temperature of the movable torches (64). The temperature sensor (62) outputs information about the detected temperature or a signal indicating the detected temperature to the first control device (63). The temperature sensor (62) is a radiation thermometer.

The first control device (63) controls the size of the heating flame emitted from the movable torches (64) and the movement of the first burner (61). The first control device (63) includes a microcomputer and a memory device for storing software for operating the microcomputer. The first control device (63) is connected to various components of the first burner (61) by wire or wirelessly. The first control device (63) controls the operation of various components of the first burner (61).

The first control device (63) controls the flow rate of the gas supplied to the first burner (61) based on the temperature information (the temperature of the first burner (61)) received from the temperature sensor (62). The control of the gas flow rate will be described later.

The first control device (63) controls the movement of the first burner (61) based on a predetermined operation program. The first control device (63) has an operation program for each type (model) of the heat exchanger (1). Thus, the first control device (63) performs brazing for each model.

Figure 8:
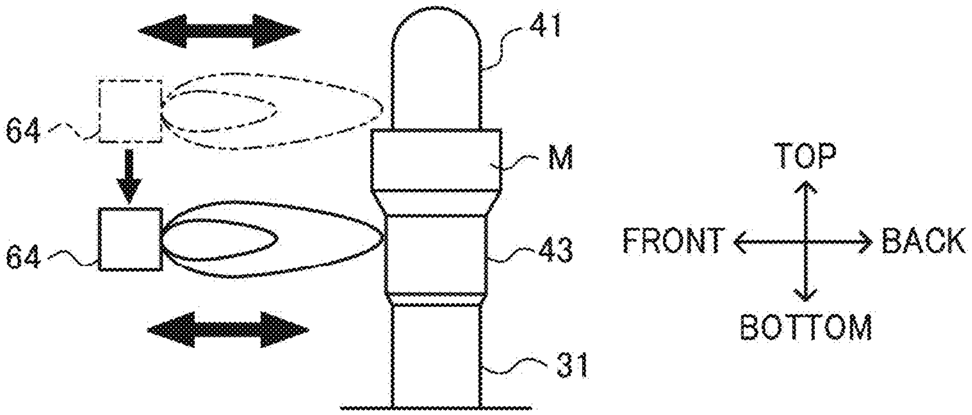
FIG. 8 is a schematic view showing how the first burner moves.

As illustrated in FIG. 8, the first control device (63) moves the movable torches (64) to heat the first joint (43). The first burner (61) is controlled so that the movable torches (64) move in the front-to-back direction and the vertical direction. Specifically, the movable torches (64) heat an upper end portion of the brazing material (M) while reciprocating in the front-to-back direction. Thereafter, the movable torches (64) descends to heat a lower end portion of the brazing material (M) while reciprocating in the front-to-back direction. In this way, the first burner (61) performs brazing while moving around the first joint (43). Time for heating the upper portion of the brazing material (M) and time for heating the lower portion of the brazing material (M) are appropriately set.

The distance that the movable torches (64) reciprocate is approximately equal to the outer diameter of the first joint (43). That is, the heating flame emitted from each of the movable torches (64) reciprocates a distance between a front end and rear end of the first joint (43) when the heat exchanger (1) is viewed from above. The two movable torches (64) also heat upper left and upper right portions and lower left and lower right portions of the first joint (43). This can reduce local heating of the first joint (43), and the temperature increases in the whole part of the first joint (43).

The first control device (63) controls the distance between the outlets of the movable torches (64) and the first joint (43) to a predetermined distance. This reduces variations in brazing accuracy of the first joint (43) among various types of heat exchangers (1).

In particular, the clamp mechanism (50) reduces horizontal misalignment of the heat exchangers (1), reducing variations in the brazing degree among the heat exchangers (1). Further, the clamp mechanism (50) keeps the upper end of the heat exchanger (1) from swinging in the front-to-back direction, and the distance between the outlet of the first burner (61) and the first joint (43) can be kept constant, stabilizing the amount of heat applied to the first joint (43).

(2-4) Second Brazing

Figure 9:
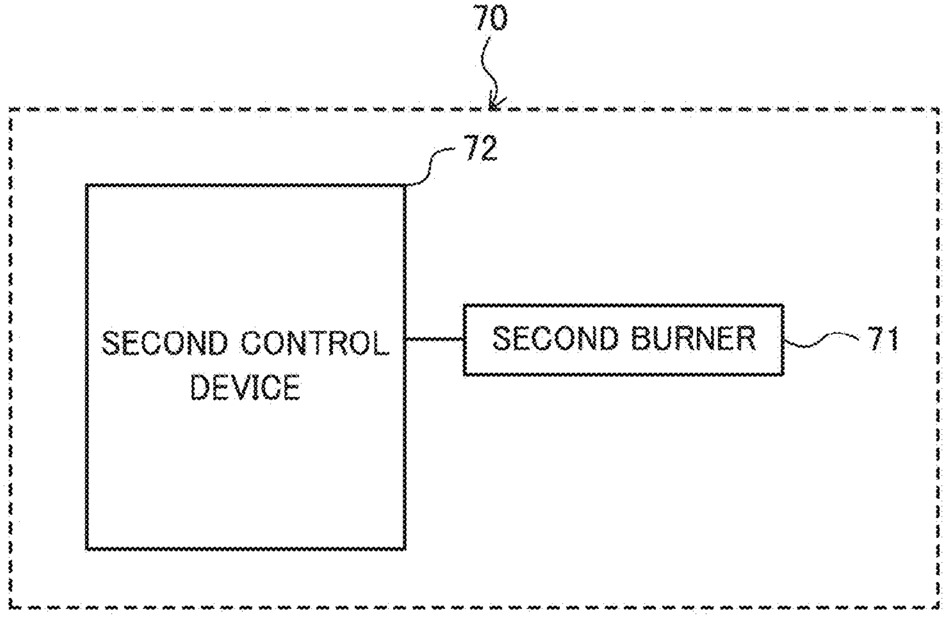
FIG. 9 is a block diagram showing the configuration of a second brazing device.
Figure 10:
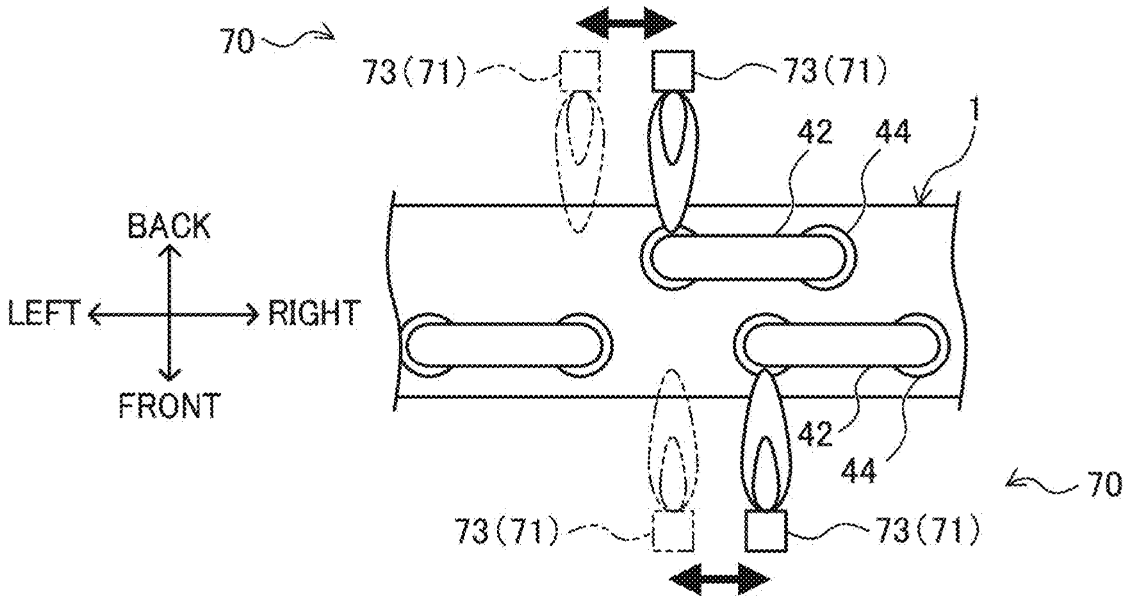
FIG. 10 is a schematic view showing how the second burner moves.

As illustrated in FIGS. 9 and 10, the second brazing is a step of brazing the joint between the second open end portion (32) and the second connection pipe (42). The second brazing device (70) is used in the second brazing. The second brazing device (70) includes a second burner (71) and a second control device (72).

The second burner (71) heats the second joint (44) which is a connection between the second open end portion (32) and the second connection pipe (42). The second burner (71) is a stationary burner. The second burner (71) includes a plurality of stationary torches (73).

Each of the stationary torches (73) is arranged with a heating flame outlet directed toward the joint (43, 44). Specifically, the stationary torches (73) are fixed to predetermined fixture members (not shown) extending in the right-to-left direction in front of and behind the heat exchanger (1). Thus, the stationary torches (73) arranged in front of the heat exchanger (1) heat the second joints (44) arranged in the front portion of the heat exchanger (1). The stationary torches (73) fixed to the fixture members behind the heat exchanger (1) heat the second joints (44) arranged in the rear portion of the heat exchanger (1).

The second burner (71) reciprocates in the right-to-left direction. The second control device (72) controls the movement of the second burner (71).

The second control device (72) causes the second burner (71) to reciprocate in the right-to-left direction. The distance that the second burner (71) reciprocate is approximately equal to the outer diameter of the second joint (44). That is, each of the stationary torches (73) reciprocates a distance between a right end and left end of the second joint (44) when the heat exchanger (1) is viewed from above. Thus, the second joint (44) is uniformly heated by the heating flame of each stationary torch (73). The second joint (44) is heated for an appropriately set time.

The second connection pipe (42) has a lower heat capacity than the first connection pipe (41). Thus, the amount of heat that the second burner (71) applies to the second connection pipe (42) is less than the amount of heat that the first burner (61) applies to the first connection pipe (41).

(2-5) Control of Gas Flow Rate

When the temperature of the movable torches (64) of the first burner (61) rises, the inner diameters of the movable torches (64) increase due to thermal expansion, and the gas flow rate changes. Due to the temperature increase of the movable torches (64), the radiant heat of the movable torches (64) may affect the temperature of the first joint (43). Thus, the temperature change of the movable torches (64) affects the heating of the first joint (43).

Figure 11:
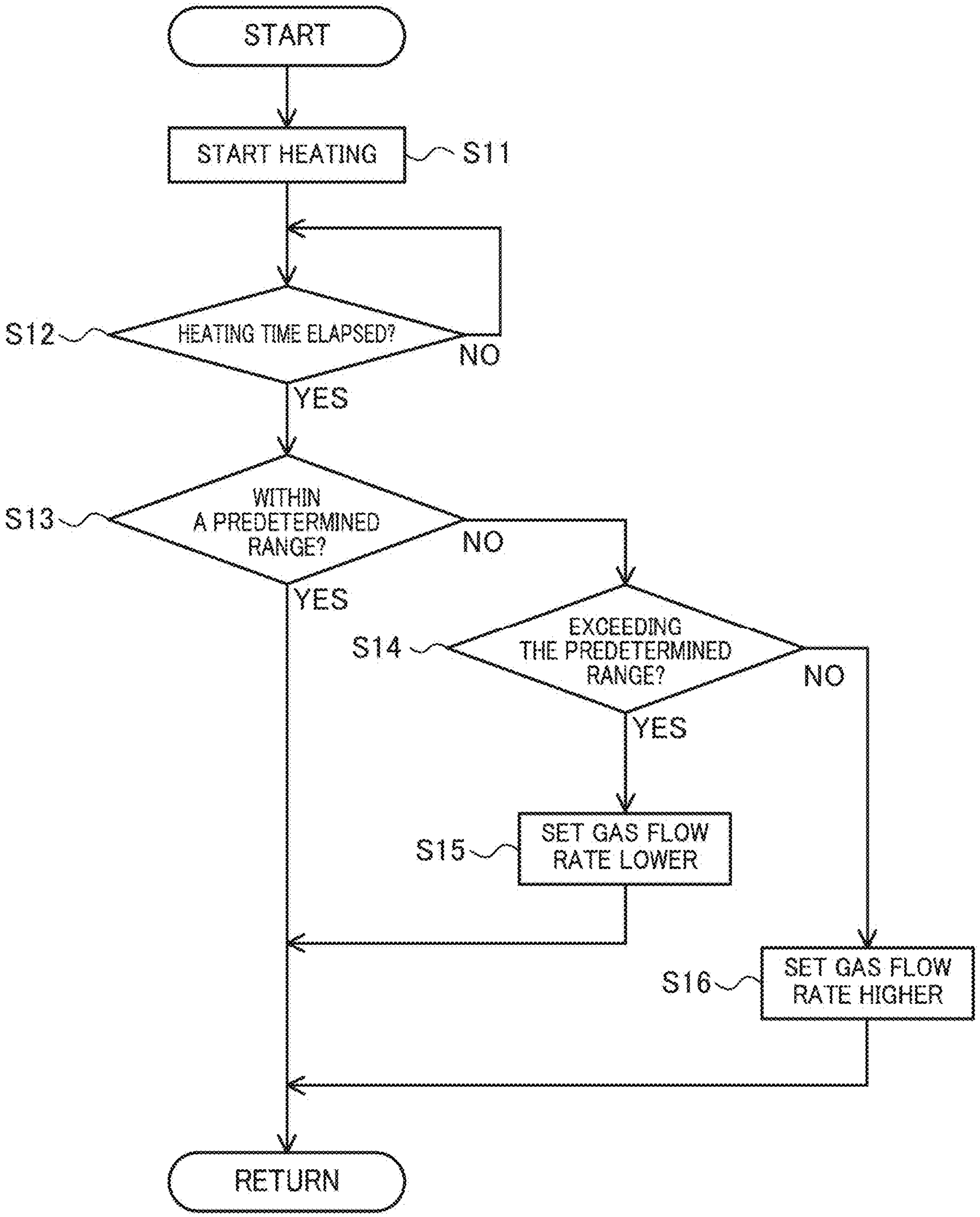
FIG. 11 is a flowchart of the control of a gas flow rate.

Even if the heating is performed for the same period of time, the accuracy of brazing of the first joint (43) varies depending on the temperature change of the movable torches (64). Thus, the amount of heat that the first joint (43) receives is preferably kept constant. In this embodiment, the flow rate of the gas injected from the first burner (61) in the first brazing is controlled based on the temperature of the first burner (61). The control of the flow rate of the gas supplied to the first burner (61) will be described below with reference to FIG. 11.

In Step S11, the first control device (63) operates the first burner (61) to start heating the first joint (43) at a preset gas flow rate. This increases the temperature of the first joint (43).

In Step S12, the first control device (63) determines whether a predetermined time (heating time) has elapsed from the start of heating. If it is determined that the heating time has elapsed (YES in Step S12), Step S13 is performed. If it is determined that the heating time has not elapsed (NO in Step S12), heating is continued and Step S12 is performed again.

In Step S13, the first control device (63) determines whether the temperature of the movable torches (64) is in a predetermined temperature range. If it is determined that the temperature of the movable torches (64) is in the predetermined temperature range (YES in Step S13), the control returns. Once the control returns, the flow rate of the gas set in Step S11 is adopted, and the first brazing is performed. If it is determined that the temperature of the movable torches (64) is not in the predetermined temperature range (NO in Step S13), Step S14 is performed.

In Step S14, the first control device (63) determines whether the temperature of the movable torches (64) exceeds the predetermined range. If it is determined that the temperature of the movable torches (64) exceeds the predetermined range (YES in Step S14), Step S15 is performed. If it is determined that the temperature of the movable torches (64) does not exceed the predetermined range (NO in Step S14), it is determined that the temperature of the movable torches (64) falls below the predetermined temperature range, and Step S16 is performed.

In Step S15, the first control device (63) sets the gas flow rate lower than the gas flow rate set in Step S11. Then, the subsequent first brazing is performed at the gas flow rate set in Step S15.

In Step S16, the first control device (63) sets the gas flow rate higher than the gas flow rate set in Step S11. The subsequent first brazing is performed at the gas flow rate set in Step S16.

Thus, controlling the gas flow rate keeps the first joint (43) from receiving an excessive amount of heat and gives the first joint (43) a constant amount of heat, stabilizing the accuracy of brazing of each first joint (43).

(3) Features (3-1) First Feature

The method for manufacturing the heat exchanger (1) of this embodiment includes: connecting the first open end portion (31) of the aluminum heat transfer tube (30) and the aluminum first connection pipe (41); and first brazing the first joint (43) between the first open end portion (31) and the first connection pipe (41) by heating the first joint (43) with the first movable burner (61) movable around the first joint (43).

Figure 12:
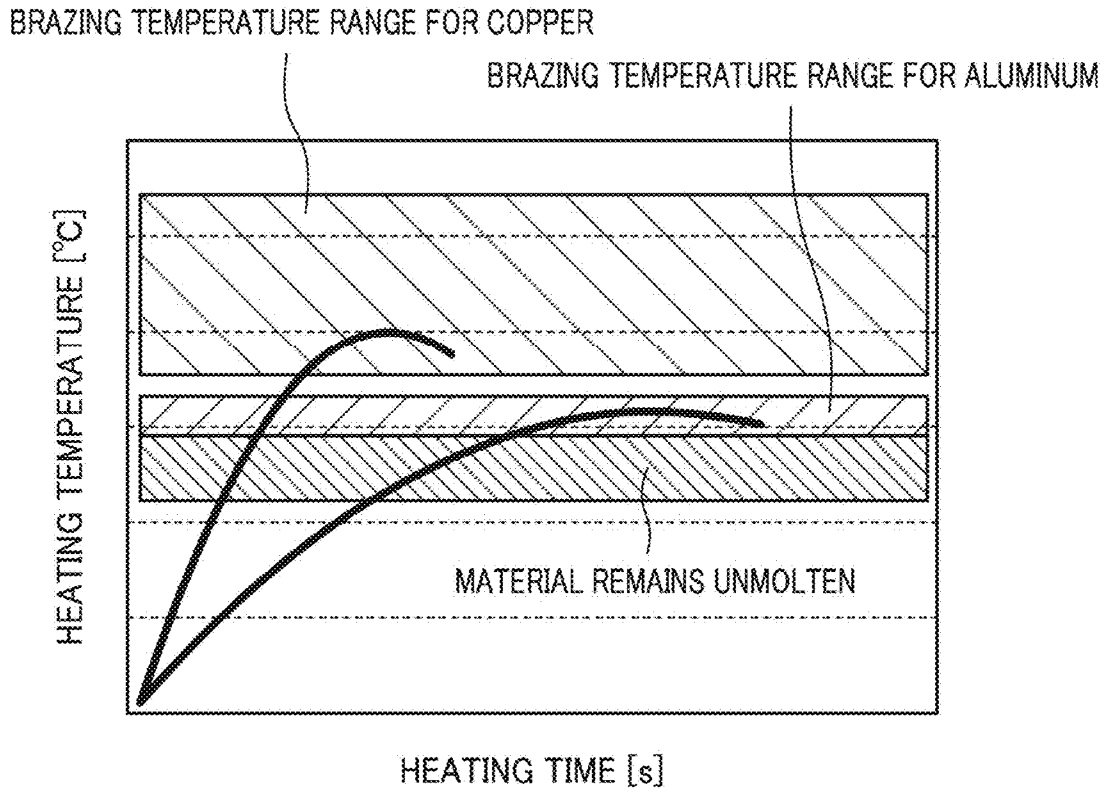
FIG. 12 is a graph showing the temperature and heating time for brazing an aluminum heat transfer tube and a connection pipe.

As illustrated in FIG. 12, the heat transfer tube (30) and the first connection pipe (41) are made of aluminum. Thus, heating the first joint (43) requires stricter temperature control than when the heat transfer tube and the connection pipe are made of copper. Specifically, the copper heat transfer tube and the copper connection pipe are unlikely to be deformed even if they are excessively heated, and the first joint (43) can be heated until the brazing material is completely molten. While excessive heating of the aluminum heat transfer tube and the aluminum connection pipe deforms or damages the first joint (43), heating at a low temperature causes the brazing material to remain unmolten, resulting in insufficient brazing. Further, when the aluminum heat transfer tube and the aluminum connection pipe are used, the difference between the lower limit heating temperature at which no brazing material remains unmolten and the upper limit heating temperature at which the first joint (43) is not deformed is relatively small. Thus, when brazing the connection pipes having different heat capacities to the heat transfer tubes as those in the heat exchanger (1) of this embodiment, it is preferable to vary the heating conditions depending on the type of the connecting pipes.

However, when a conventional multi-head brazing device that simultaneously and intensively brazes the connections between the heat transfer tubes and the connection pipes is used, an additional auxiliary burner is required to compensate for the lack of heat so that the connection pipes having a relatively large heat capacity (corresponding to the first connection pipes (41) of this embodiment) are brazed.

However, the auxiliary burner involves adjustment of the position and angle of the torches in accordance with the heat capacity of the connection pipes. The shape, number, and arrangement of the connection pipes vary among the heat exchangers. This involves increasing the number of auxiliary burners or changing the positions of the auxiliary burners for each heat exchanger, and is not efficient for production of different types of heat exchangers.

In addition, the intensive brazing is a brazing method in which the multiple joints are heated only uniformly, and has difficulty in finely adjusting the heating for each joint. If the auxiliary burner is added, it takes time to examine conditions for determining the optimum position and angle of the auxiliary burner for each heat exchanger.

Further, if the temperature of the manufacturing apparatus itself rises during the manufacture of a large number of heat exchangers, the brazing quality also varies. Although the brazing time can be controlled in accordance with the operation state of the manufacturing apparatus, it is difficult to make the brazing accuracy constant because how the brazing quality is influenced varies depending on, for example, the shape of the connection pipes connected to the heat transfer tubes.

To address this challenge, the first movable burner (61) of this embodiment heats the first joints (43) individually. The first joints (43) can be brazed with improved accuracy by setting the heating conditions, that is, the movement of the first burner (61) and the heating time, based on the shape and the heat capacity of the first joints (43).

In addition, the first burner (61) emits the heating flame to the first joint (43) from two directions while reciprocating in the front-to-back direction, allowing uniform heating of the first joint (43). Further, the first burner (61) sequentially heats the upper portion and lower portion of the first joint (43), and thus can evenly heat the first joint (43). This can reduce local temperature rise of the first joint (43).

In addition, in this embodiment, the first burner (61) moves around the first joint (43) in accordance with the type of the heat exchanger. Thus, unlike the conventional brazing device, it is unnecessary to consider the position and angle of an auxiliary burner used to supplement the amount of heat applied to the first joint (43). Thus, although the target heat exchanger to be manufactured is changed to a different type of heat exchanger, brazing corresponding to the latter heat exchanger can quickly be performed. As described above, the manufacturing method of this embodiment allows the manufacture of various types of heat exchangers (1). This can keep the manufacturing efficiency from decreasing in the manufacture of a wide variety of target heat exchangers (1).

In addition, in this embodiment, the heat transfer tubes (30) and the first connection pipes (41) are made of aluminum, and the range between the upper and lower limits of the heating temperature for brazing is relatively narrow. While the temperature control of the first joint (43) is important, the first burner (61) which is movable allows setting of the heating conditions for each first connection pipe (41) even when the first connection pipes (41) are different in shape. This can reduce the brazing material remaining unmolten due to insufficient heating and can reduce the first joint (43) deforming due to excessive heating.

In addition, in this embodiment, the first brazing device (60) can set the operating conditions of the first burner (61) for each type of the connection pipes. This can keep the manufacturing man-hours from increasing compared to the conventional method requiring adjustment of the auxiliary burner for each connection pipe.

(3-2) Second Feature

In the manufacturing method for the heat exchanger (1) of this embodiment, the flow rate of the gas used for emitting the heating flame from the first burner (61) is controlled based on the temperature of the first burner (61) in the first brazing.

As described above, when the thermal expansion of the movable torches (64) changes the inner diameters of the outlets, the flow rate of the gas changes, and the amount of heat applied to the first joint (43) also changes. In addition, an increase in the radiant heat emitted from the movable torches (64) affects the amount of heat applied to the first joint (43). Thus, in the first brazing, the flow rate of the gas is adjusted in accordance with the temperature of the movable torches (64). This can keep the gas flow rate constant even when the movable torches (64) thermally expand, and can keep the amount of heat applied to the first joint (43) constant.

In addition, although the first brazing is also affected by the temperature of the manufacturing equipment itself that increases as the first brazing device (60) works, controlling the gas flow rate of the first burner (61) can reduce variations in the brazing degree, allowing stable production of the heat exchanger (1).

(3-3) Third Feature

In the manufacturing method for the heat exchanger (1) of this embodiment, the gas for producing the heating flame emitted from the first burner (61) is a mixed gas of a combustion gas and the air, and the air has an oxygen concentration of 95% or more. Although a mixed gas of a combustion gas and a combustion-supporting gas has been used as the gas for producing the heating flame, use of the oxygen-rich air as the combustion-supporting gas can increase the heating power. In the first brazing, the first burner (61) individually heats the first joints (43), which takes a relatively long brazing time. In this embodiment, the heating power of the first burner (61) can be increased, and the first brazing time can be shortened.

(3-4) Fourth Feature

The manufacturing method for the heat exchanger (1) of this embodiment further includes second brazing the second joint (44) by heating the second joint (44) with the second stationary burner (71), and the second brazing is performed after the first brazing. The second connection pipe (42) is made of aluminum.

The first connection pipe (41) has a higher heat capacity than the second connection pipe (42), and more heat is required to braze the first joint (43) than to braze the second joint (44). Thus, if the first brazing is performed after the second brazing, the temperature of the second joint (44) is raised by the amount of heat applied in the first brazing, and the fillet once formed in the second joint (44) is molten. However, performing the second brazing after the first brazing can keep the fillet in the second joint (44) from melting (see FIG. 5A and FIG. 5B).

(3-5) Fifth Feature

In the manufacturing method for the heat exchanger (1) of this embodiment, part of the heat exchanger (1) that the clamp mechanism (50) holds is adjusted based on the type of the heat exchanger (1).

According to this embodiment, the clamp mechanism (50) can position each heat exchanger (1) with improved accuracy. When the positioning accuracy is improved, the distance between the outlets of the movable torches (64) and the first joint (43) can be made constant in the first brazing, keeping the amount of heat applied to the first joint (43) constant. As a result, the brazing accuracy can be made constant among the heat exchangers (1).

In addition, the clamp mechanism (50) fixes the upper portion of the heat exchanger (1) to keep the upper end of the heat exchanger (1) from swinging. The clamp mechanism (50) can change part of the heat exchanger (1) that the clamp mechanism (50) holds in the height direction, and can fix the upper portion of the heat exchanger (1) according to the type of the heat exchanger (1). Thus, a wide variety of heat exchangers (1) can be manufactured.

(4) Variation

Figure 13:
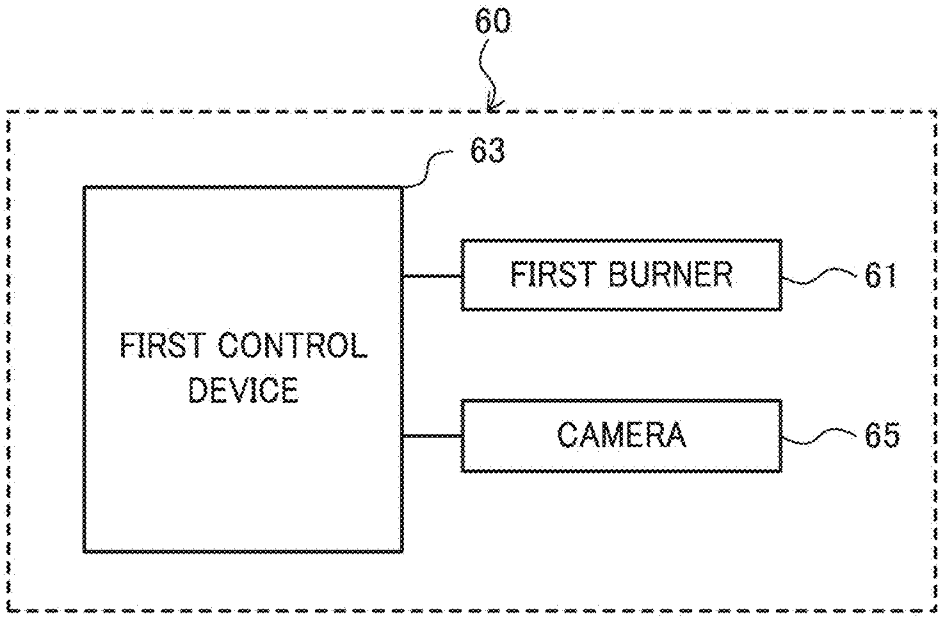
FIG. 13 is a block diagram showing a configuration of a first brazing device according to a variation.

In this variation, the first control device (63) controls the flow rate of a predetermined gas based on the brazing degree of the first joint (43). The predetermined gas is the same as the gas used in the above-described embodiment. As illustrated in FIG. 13, the first brazing device (60) includes a camera (65). The camera (65) detects the first joint (43) being heated as image data. For example, the first brazing device (60) has data indicating the relationship between image data showing the degree of brazing of the first joint (43) and an evaluation value indicating the brazing degree.

Figure 14:
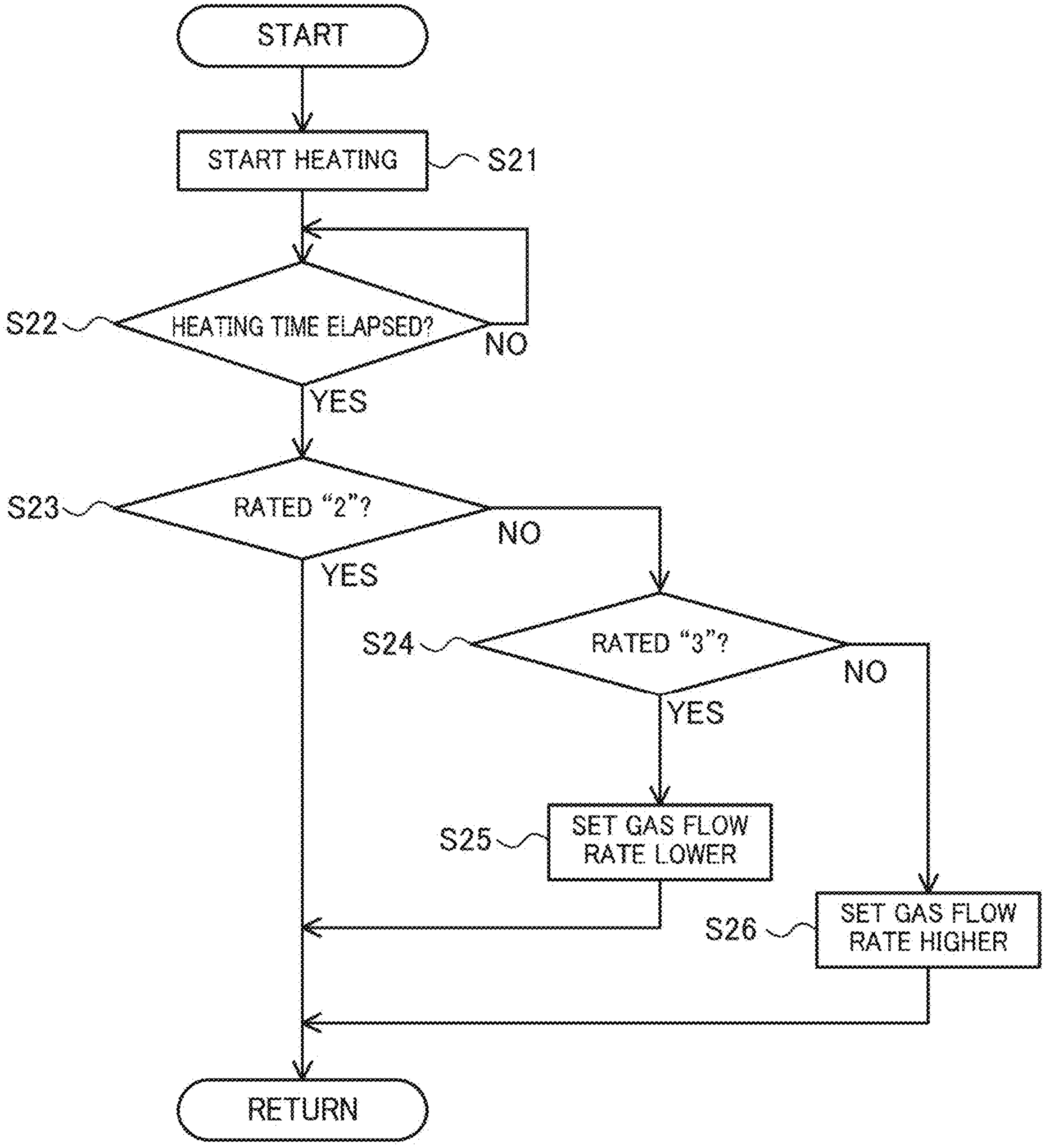
FIG. 14 is a flowchart of the control of a gas flow rate according to the variation.

The evaluation value indicating the brazing degree is a numerical value rated on a scale of 1 to 3. For example, "1" indicates the most insufficient brazing degree, "2" indicates the best brazing state, and "3" indicates that the temperature of the first joint (43) increased too much. The first control device (63) evaluates which one of the three levels the brazing degree is in based on the image data received from the camera (65). The first control device (63) controls the gas flow rate based on the estimated brazing degree. This will be described below with reference to FIG. 14.

In Step S21, the first control device (63) operates the first burner (61) to start heating the first joint (43) at a preset gas flow rate. This increases the temperature of the first joint (43).

In Step S22, the first control device (63) determines whether a predetermined time (heating time) has elapsed from the start of heating. If it is determined that the heating time has elapsed (YES in Step S22), Step S13 is performed. If it is determined that the heating time has not elapsed (NO in Step S22), the heating is continued and Step S22 is performed again.

In Step S23, the first control device (63) evaluates the brazing degree of the first joint (43) based on the image received from the camera (65). Specifically, the first control device (63) determines whether the brazing degree of the first joint (43) is rated "2." If the brazing degree of the first joint (43) is "2" (YES in Step S23), the control returns. If the control returns, the flow rate of the gas set in Step S21 is adopted, and the first brazing is performed. If it is determined that the brazing degree of the first joint (43) is not rated "2" (NO in Step S23), Step S24 is performed.

In Step S24, the first control device (63) determines whether the brazing degree of the first joint (43) is rated "3." If it is determined that the brazing degree of the first joint (43) is rated "3" (YES in Step S24), Step S25 is performed. If it is determined that the brazing degree of the first joint (43) is not rated "3" (NO in Step S24), it is determined that the brazing degree of the first joint (43) is rated "1," and Step S26 is performed.

In Step S25, the first control device (63) sets the gas flow rate lower than the gas flow rate set in Step S21. The subsequent first brazing is performed at the gas flow rate set in Step S25.

In Step S26, the first control device (63) sets the gas flow rate higher than the gas flow rate set in Step S21. The subsequent first brazing is performed at the gas flow rate set in Step S26.

Feeding back the brazing degree of the first joint (43) in this way allows control of the gas flow rate so that the subsequent brazing is performed to a favorable degree.

(5) Other Embodiments

The first brazing device (60) may include a plurality of first burners (61). In the first brazing, the first joints (43) are brazed simultaneously by the plurality of first burners (61). This can shorten the time required for the first brazing.

In the first brazing, the heat exchanger (1) may be fixed by the clamp mechanism (50), and the position of the first burner (61) may be adjusted based on the deviation of the heat exchanger (1) from a reference position. This allows the first burner to heat the first joint (43) from a fixed distance.

The first brazing device (60) may include a laser displacement meter (not shown). The laser displacement meter measures the position of the first connection pipe (41) after the positioning by the clamp mechanism (50). If the first connection pipe (41) is displaced from the reference position (e.g., displaced from the reference position by ±0.5 mm), the first control device (63) adjusts the distance between the outlet of the first burner (61) and the first joint (43) based on the amount of displacement. This can keep the distance between the first joint (43) and the outlet of the first burner (61) constant although the first connection pipe (41) is misaligned.

The gas flow rate may be controlled to adjust the mixing ratio of the combustion gas and the air.

While the embodiments and the variation thereof have been described above, it will be understood that various changes in form and details may be made without departing from the spirit and scope of the claims. The embodiment and the variation thereof may be combined and replaced with each other without deteriorating intended functions of the present disclosure. The expressions of "first," "second," . . . described above are used to distinguish the terms to which these expressions are given, and do not limit the number and order of the terms.

As can be seen from the foregoing description, the present disclosure is useful for a method for manufacturing a heat exchanger.

The invention claimed is:

1. A method for manufacturing a heat exchanger including a plurality of fins arranged in a thickness direction and a plurality of heat transfer tubes penetrating the plurality of fins, the heat transfer tubes being made of aluminum, the method comprising:

connecting
- a first open end portion of open end portions of the heat transfer tubes protruding from the fins, and
- a first connection pipe made of aluminum;

connecting
- a second open end portion of the open end portions of the heat transfer tubes protruding from the fins, and
- a second connection pipe made of aluminum and having a lower heat capacity than the first connection pipe;

performing a first brazing of a first joint between the first open end portion and the first connection pipe by heating the first joint with a first burner that is movable around the first joint; and performing a second brazing of a second joint between the second open end portion and the second connection pipe by heating the second joint with a second burner that is stationary, the second brazing being performed after the first brazing.

2. The method of claim 1, wherein
in the first brazing, a flow rate of a gas used to emit a heating flame from the first burner is controlled based on a temperature of the first burner.

3. The method of claim 2, wherein
the gas is a mixed gas of a combustion gas and air, and the air has an oxygen concentration of 95% or more.

4. The method of claim 1, wherein
in the first brazing, a flow rate of a gas used to emit a heating flame from the first burner is controlled based on an image of the first joint captured with a camera.

5. The method of claim 2, wherein
in the first brazing, the flow rate of the gas is further controlled based on an image of the first joint captured with a camera.

6. The method of claim 3, wherein
in the first brazing, the flow rate of the gas is further controlled based on an image of the first joint captured with a camera.

7. The method of claim 1, wherein
in the first brazing, the heat exchanger is fixed by a clamp mechanism, and a position of the first burner is adjusted based on an amount of deviation of the heat exchanger from a predetermined reference position.

8. The method of claim 2, wherein in the first brazing, the heat exchanger is fixed by a clamp mechanism, and a position of the first burner is adjusted based on an amount of deviation of the heat exchanger from a predetermined reference position.

9. The method of claim 3, wherein in the first brazing, the heat exchanger is fixed by a clamp mechanism, and a position of the first burner is adjusted based on an amount of deviation of the heat exchanger from a predetermined reference position.

10. The method of claim 4, wherein in the first brazing, the heat exchanger is fixed by a clamp mechanism, and a position of the first burner is adjusted based on an amount of deviation of the heat exchanger from a predetermined reference position.

11. The method of claim 7, wherein part of the heat exchanger that the clamp mechanism holds is adjusted based on a type of the heat exchanger.

12. The method of claim 1, wherein in the first brazing, the first burner includes a plurality of first burners, the first joint includes a plurality of first joints, and the plurality of first joints are brazed simultaneously by the plurality of burners.

* * * * *